US009444346B2

(12) United States Patent
Chen et al.

(10) Patent No.: US 9,444,346 B2
(45) Date of Patent: Sep. 13, 2016

(54) APPARATUS AND EFFICIENCY POINT TRACKING METHOD FOR HIGH EFFICIENCY RESONANT CONVERTERS

(71) Applicant: FutureWei Technologies, Inc., Plano, TX (US)

(72) Inventors: Daoshen Chen, Allen, TX (US); Heping Dai, Plano, TX (US); Xujun Liu, Shenzhen (CN); Zhihua Liu, Shenzhen (CN); Liming Ye, Frisco, TX (US); Dianbo Fu, Plano, TX (US); Ce Liu, Shenzhen (CN); Bing Cai, Richardson, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 243 days.

(21) Appl. No.: 14/056,532

(22) Filed: Oct. 17, 2013

(65) Prior Publication Data

US 2015/0109824 A1 Apr. 23, 2015

(51) Int. Cl.
| | | |
|---|---|---|
| H02M 3/22 | (2006.01) | |
| H02M 3/156 | (2006.01) | |
| H02M 3/325 | (2006.01) | |
| H02M 3/335 | (2006.01) | |
| H02M 3/337 | (2006.01) | |
| H02M 1/00 | (2006.01) | |

(52) U.S. Cl.
CPC ............. *H02M 3/22* (2013.01); *H02M 3/156* (2013.01); *H02M 3/325* (2013.01); *H02M 3/3376* (2013.01); *H02M 3/33507* (2013.01); *H02M 3/33523* (2013.01); *H02M 3/33576* (2013.01); H02M 2001/0058 (2013.01); Y02B 70/1433 (2013.01); Y02B 70/1491 (2013.01)

(58) Field of Classification Search
CPC ...... H02M 3/22; H02M 3/156; H02M 3/325; H02M 3/33523; H02M 3/33576
See application file for complete search history.

(56) References Cited

U.S. PATENT DOCUMENTS

| | | | | | |
|---|---|---|---|---|---|
| 3,584,288 | A | * | 6/1971 | Boehm | 363/75 |
| 5,309,344 | A | * | 5/1994 | Smith | 363/20 |
| 6,301,128 | B1 | * | 10/2001 | Jang et al. | 363/17 |
| 6,492,880 | B1 | * | 12/2002 | Chiappe | H04L 25/0266 333/22 R |
| 7,145,786 | B2 | | 12/2006 | Vinciarelli | |
| 2005/0099827 | A1 | * | 5/2005 | Sase et al. | 363/16 |
| 2007/0070655 | A1 | | 3/2007 | Eguchi et al. | |
| 2010/0020578 | A1 | * | 1/2010 | Ryu et al. | 363/68 |
| 2010/0033882 | A1 | * | 2/2010 | Skatulla | 361/18 |

(Continued)

OTHER PUBLICATIONS

International Search Report of Patent Cooperation Treaty (PCT), International Application No. PCT/CN2014/088828, Applicant Huawei Technologies Co., Ltd., date of mailing Dec. 30, 2014, 12 pages.

*Primary Examiner* — Timothy J Dole
*Assistant Examiner* — Ishrat Jamali
(74) *Attorney, Agent, or Firm* — Slater Matsil, LLP

(57) ABSTRACT

A converter comprises an input stage coupled to a power source, wherein the input stage comprises a plurality of power switches, a resonant tank coupled to the plurality of power switches, a transformer coupled to the resonant tank, an output stage coupled to the transformer, an efficiency point tracking indicator coupled to the converter, a detector coupled to the efficiency point tracking indicator and a control circuit configured to receive an efficiency point tracking signal from the detector and adjust a switching frequency of the power switches based upon the efficiency point tracking signal.

16 Claims, 8 Drawing Sheets

(56) References Cited

U.S. PATENT DOCUMENTS

| | | | |
|---|---|---|---|
| 2010/0244726 A1* | 9/2010 | Melanson | 315/291 |
| 2012/0039378 A1 | 2/2012 | Nakayama | |
| 2012/0062190 A1* | 3/2012 | Haiplik et al. | 323/271 |
| 2013/0163290 A1 | 6/2013 | Moon et al. | |

* cited by examiner

APPARATUS AND EFFICIENCY POINT TRACKING METHOD FOR HIGH EFFICIENCY RESONANT CONVERTERS

TECHNICAL FIELD

The present invention relates to a resonant converter, and, in particular embodiments, to a control mechanism for resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which provide an inductor-inductor-capacitor (LLC) resonant power converter having high efficiency as well as a better regulation.

In accordance with an embodiment, a converter comprises an input stage coupled to a power source, wherein the input stage comprises a plurality of power switches, a resonant tank coupled to the plurality of power switches, a transformer coupled to the resonant tank, an output stage coupled to the transformer, an efficiency point tracking indicator coupled to the converter, a detector coupled to the efficiency point tracking indicator and a control circuit configured to receive an efficiency point tracking signal from the detector and adjust a switching frequency of the power switches based upon the efficiency point tracking signal.

In accordance with another embodiment, a method comprises providing a resonant converter, wherein the resonant converter comprises an input stage coupled to a power source, wherein the input stage comprises a plurality of power switches, a resonant tank coupled to the plurality of power switches, a transformer coupled to the resonant tank and an output stage coupled to the transformer.

The method further comprises detecting a signal indicating a soft switching process of the resonant converter and adjusting, by a control circuit, a switching frequency of the resonant converter until a magnitude of the signal is less than a predetermined threshold.

In accordance with yet another embodiment, a method comprises providing a first resonant converter, wherein the first resonant converter comprises a power stage comprising an input stage coupled to a power source, wherein the input stage comprises a plurality of power switches, a resonant tank coupled to the plurality of power switches, an isolation device coupled to the resonant tank and an output stage coupled to the isolation device through a rectifier and a control circuit coupled to the power switches, wherein the control circuit generates a plurality of gate drive signals for the power switches.

The method further comprises detecting a signal indicating a soft switching process of the first resonant converter, detecting a load current of the first resonant converter and configuring a switching frequency of the first resonant converter such that adjusting the switching frequency until a magnitude of the signal is less than a predetermined threshold when the load current is greater than a predetermined load level and increasing the switching frequency until an output voltage of the first resonant converter is within a predetermined regulation range when the load current is less than the predetermined load level.

An advantage of a preferred embodiment of the present invention is improving a power converter's efficiency as well as regulation through an efficiency point tracking control mechanism, an output voltage tracking control mechanism, an adjustable gate drive voltage control mechanism, a duty cycle control mechanism and any combinations thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an efficiency point tracking control mechanism for an inductor-inductor-capacitor (LLC) resonant converter. The invention may also be applied, however, to a variety of resonant converters. Hereinafter, various embodiments will be explained in detail with reference to the accompanying drawings.

Figure 1:
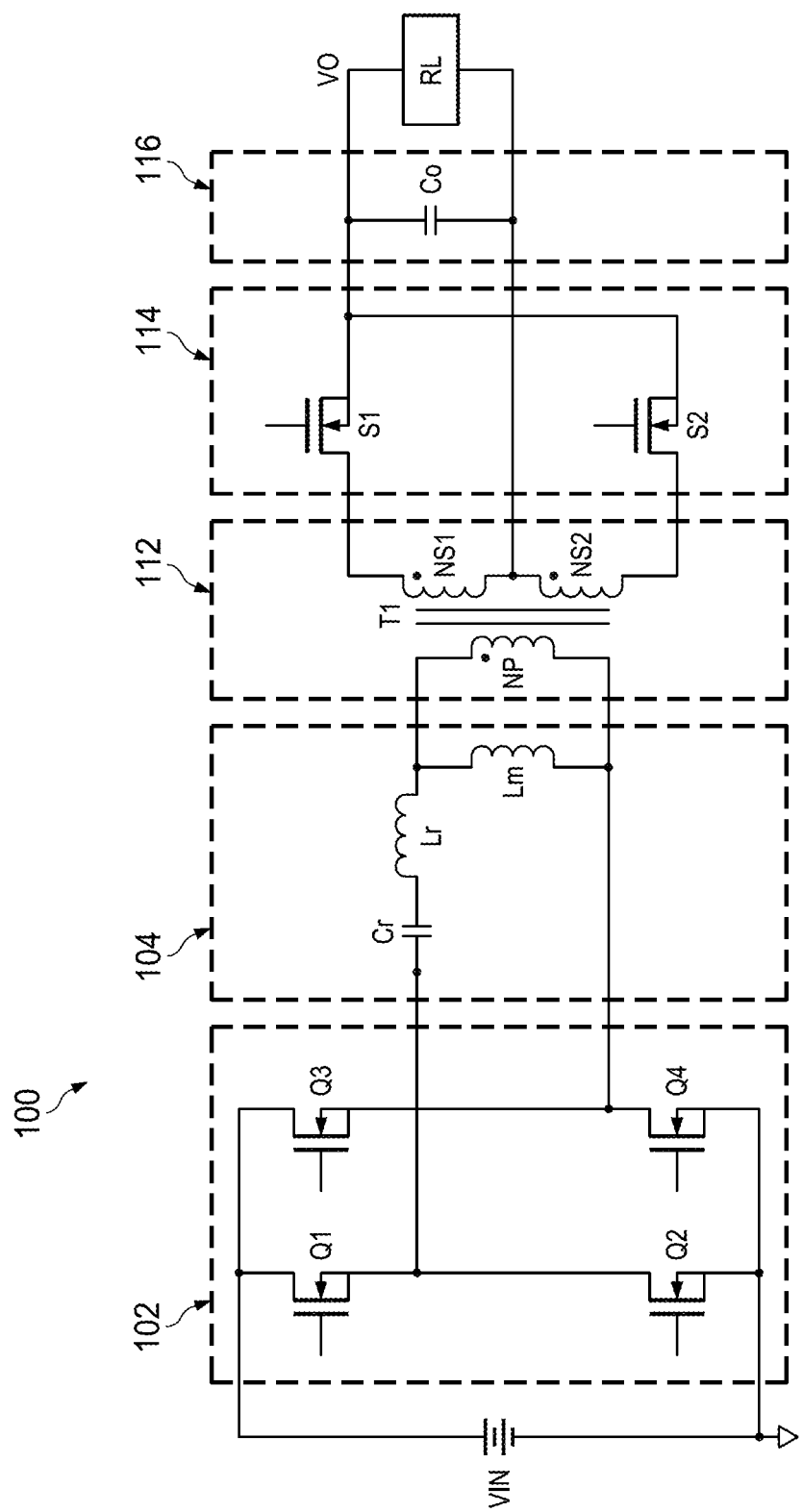
FIG. 1 illustrates a schematic diagram of an LLC resonant converter in accordance with various embodiments of the present disclosure.

FIG. 1 illustrates a schematic diagram of an LLC resonant converter in accordance with various embodiments of the present disclosure. The LLC resonant converter 100 is coupled between an input dc power source VIN and a load. The input dc power source VIN may be telecommunication power supplies converting a utility line voltage to a dc voltage. Alternatively, the input dc power source VIN may be a solar panel array. Furthermore, the input dc power source VIN may be an energy storage device such as rechargeable batteries, fuel cells and/or the like. The load represents the power consumed by a circuit coupled to the LLC resonant converter 100. Alternatively, the load may refer to downstream converters coupled to the output of the LLC resonant converter 100.

The LLC resonant converter 100 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input dc power source VIN and the load.

Figure 3:
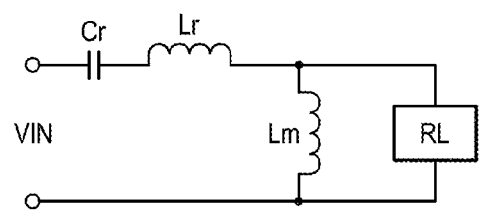
FIG. 3 illustrates an equivalent circuit of the LLC resonant converter shown in FIG. 1 in accordance with various embodiments of the present disclosure.

The switch network 102 includes four switching elements, namely Q1, Q2, Q3 and Q4. As shown in FIG. 3, a first pair of switching elements Q1 and Q2 are connected in series. A second pair of switching elements Q3 and Q4 are connected in series. The common node of the switching elements Q1 and Q2 is coupled to a first input terminal of the resonant tank 104. Likewise, the common node of the switching elements Q3 and Q4 is coupled to a second input terminal of the resonant tank 104.

As shown in FIG. 1, the switching elements Q1, Q2, Q3 and Q4 may form a primary side switching network of a full bridge converter. According to some embodiments, switching elements Q1, Q2, Q3 and Q4 are implemented as MOSFET or MOSFETs connected in parallel.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the switch network 102 shown in FIG. 1 includes the primary side switches of a full bridge resonant converter according to some embodiments. Alternatively, the switch network 102 may be of the primary side switches of other bridge converters such as a half-bridge resonant converter, a push-pull resonant converter, any combinations thereof and the like.

It should further be noted that while FIG. 1 illustrates four switches Q1, Q2, Q3, and Q4, various embodiments of the present disclosure may include other variations, modifications and alternatives. For example, a separate capacitor (not shown) may be connected in parallel with each switch (e.g., switch Q1) of the primary side switching network 102. Such a separate capacitor helps to better control the timing of the resonant process of the LLC resonant converter 100.

FIG. 1 shows that the resonant tank 104 is formed by a resonant inductor Lr, a resonant capacitor Cr and the magnetizing inductance Lm of the transformer 112. As shown in FIG. 1, the resonant inductor Lr and the resonant capacitor Cr are connected in series and further coupled between a first terminal of the primary side of the transformer 112 and a common node of the switches Q1 and Q2.

As shown in FIG. 1, the inductor connected in parallel with the transformer 112 may be implemented as a magnetizing inductance of the transformer 112. Alternatively, the resonant inductor Lr may be implemented as external inductors.

The configuration of the resonant tank 104 described above is merely an example. There may be many variation, alternatives and modifications. For example, the resonant inductor Lr may be implemented as a leakage inductance of the transformer 112. In addition, the inductor connected in parallel with the transformer 112 may be implemented as a separate inductor connected in parallel with the primary side of the transformer 112.

The transformer 112 may be of a primary winding NP, a first secondary winding NS1 and a second secondary winding NS2. The primary winding NP is coupled to the resonant tank 104 as shown in FIG. 1. The secondary windings are coupled to the load through the rectifier 114.

It should be noted that the transformers illustrated herein and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

It should further be noted the transformer structure shown in FIG. 1 is merely an example. One person skilled in the art will recognize many alternatives, variations and modification. For example, the transformer 112 may be a non-center tapped transformer coupled between the primary side switching network and the rectifier 114. The secondary side employs a full-wave rectifier formed by four switching elements. The operation principle of a rectifier coupled to a center tapped transformer secondary side is well known, and hence is not discussed in further detail herein.

It should be noted that the power topology of the LLC resonant converter 100 may be not only applied to a rectifier as shown in FIG. 1, but also applied to other secondary configurations, such as voltage doubler rectifiers, current doubler rectifiers, any combinations thereof and/or the like.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 100. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter.

On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
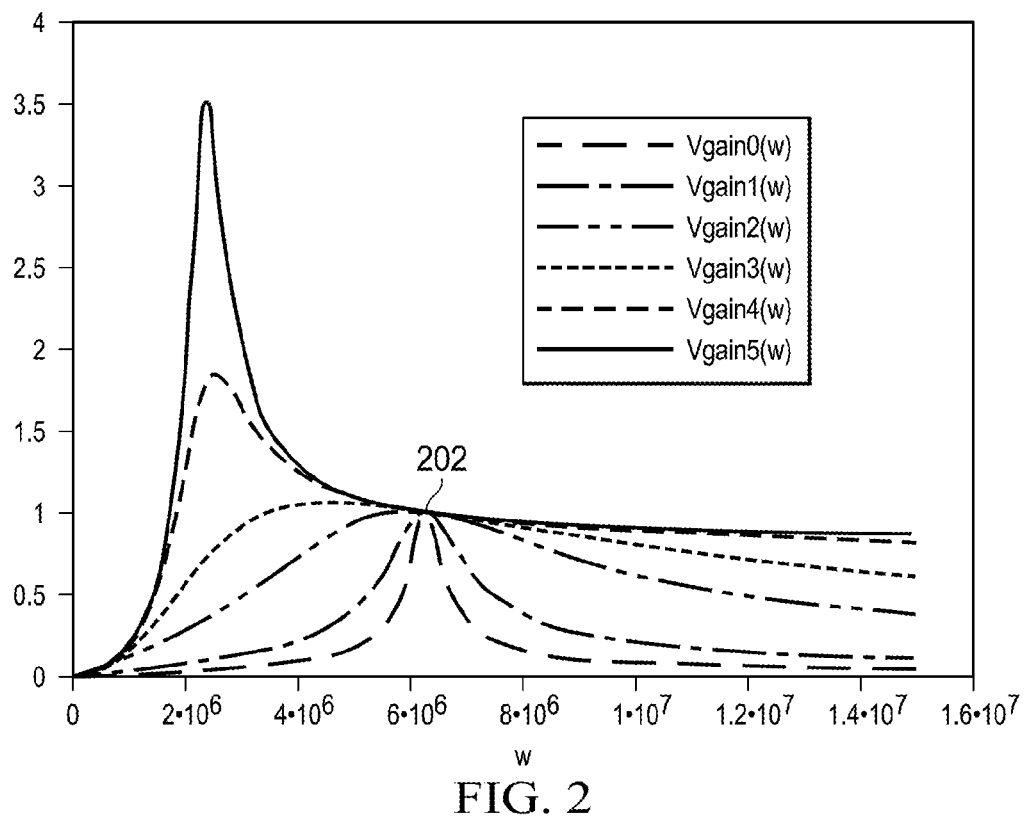
FIG. 2 illustrates a variety of voltage gain curves of the LLC resonant converter shown in FIG. 1 in accordance with various embodiments of the present disclosure.

FIG. 2 illustrates a variety of voltage gain curves of the LLC resonant converter shown in FIG. 1 in accordance with various embodiments of the present disclosure. The horizontal axis of FIG. 2 represents the switching frequency (angular frequency) of the LLC resonant converter 100. The switching frequency is in a range from 0 Hz to 2.5 MHz. The vertical axis of FIG. 2 represents the voltage gain of the LLC resonant converter 100. The voltage gain is in a range from 0 to about 3.5 as shown in FIG. 2.

FIG. 2 shows the LLC resonant converter 100 shown in FIG. 1 may be of different voltage gain characteristics depending on different switching frequencies. As shown in FIG. 2, when the LLC resonant converter 100 operates at a resonant frequency 202 of the resonant tank of the LLC resonant converter 100, the corresponding input/output voltage gain at the resonant frequency 202 is approximately equal to 1 at the vertical axis. In addition, according to the operating principle of the LLC converters, the LLC resonant converter 100 may achieve higher efficiency at the resonant frequency 202 through zero voltage switching and/or zero current switching. Zero voltage switching and zero current switching are commonly known as soft switching.

FIG. 3 illustrates an equivalent circuit of the LLC resonant converter shown in FIG. 1 in accordance with various embodiments of the present disclosure. The equivalent circuit of the LLC resonant converter 100 includes a magnetizing inductor Lm, a resonant inductor Lr, a resonant capacitor Cr and a load resistor RL. The magnetizing inductor Lm represents the magnetizing inductance of the transformer T1 shown in FIG. 1. The definition and the operation principle of the magnetizing inductance are well known in the art, and hence are not discussed herein to avoid repetition.

The load resistor RL represents the resistance of the load referred to the primary side of the transformer T1. As shown in FIG. 3, the resonant capacitor Cr and the resonant inductor Lr are connected in series. The magnetizing inductance Lm and the load resistor RL are connected in parallel.

In some embodiments, when the magnetizing inductance Lm is relatively large and the load resistor RL is relatively small, the effects of Lm and RL may be ignored in calculating the resonant frequency of the LLC resonant converter 100. Such a resonant frequency without considering the effects of Lm and RL is alternatively referred to as a short circuit resonant frequency.

Based upon the equivalent circuit shown in FIG. 3, in some embodiments, the short circuit resonant frequency of the LLC resonant converter 100 may be given by the following equation:

$$f_r = \frac{1}{2\pi\sqrt{L_r \cdot C_r}} \quad (1)$$

Figure 4:
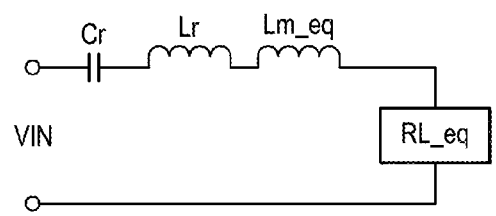
FIG. 4 illustrates another equivalent circuit of the LLC resonant converter shown in FIG. 1 in accordance with various embodiments of the present disclosure.

FIG. 4 illustrates another equivalent circuit of the LLC resonant converter shown in FIG. 1 in accordance with various embodiments of the present disclosure. Depending on different operating conditions and design needs, the magnetizing inductance Lm and the load resistor RL may not be ignored. In other words, in order to accurately calculate the resonant frequency, the impacts from the magnetizing inductance Lm and the load resistor RL should be considered in calculating the resonant frequency of the LLC resonant converter 100.

In some embodiments, the equivalent circuit shown in FIG. 3 can be replaced by the equivalent circuit show in FIG. 4. In comparison with the equivalent circuit shown in FIG. 3, an equivalent magnetizing inductance Lm_eq and an equivalent load resistor RL_eq have been introduced so that the Lm_eq and RL_eq are connected in series with Lr and Cr. The equivalent magnetizing inductance may be given by the following equation:

$$L_{m\_eq} = \frac{R_L^2 \cdot L_m}{R_L^2 + 4 \cdot \pi^2 \cdot f^2 \cdot L_m^2} \quad (2)$$

In some embodiments, the equivalent load RL_eq may be given by the following equation:

$$R_{L\_eq} = R_L \cdot \frac{4 \cdot \pi^2 \cdot f^2 \cdot L_m^2}{R_L^2 + 4 \cdot \pi^2 \cdot f^2 \cdot L_m^2} \quad (3)$$

The resonant frequency of the equivalent circuit shown in FIG. 4 is referred to as a natural resonant frequency of the LLC resonant converter 100. The natural resonant frequency may be given by the following equation:

$$f_{r\_n} = \frac{1}{2\pi\sqrt{(L_r + L_{m\_eq}) \cdot C_r}} \quad (4)$$

Figure 5:
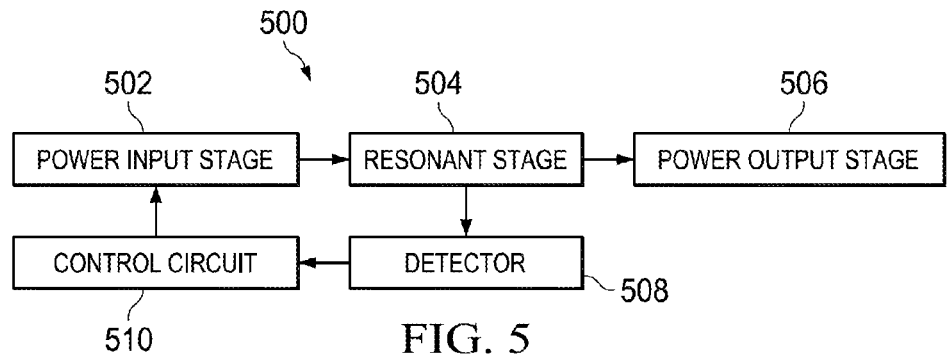
FIG. 5 illustrates a block diagram of a power converter in accordance with various embodiments of the present disclosure.

FIG. 5 illustrates a block diagram of a power converter in accordance with various embodiments of the present disclosure. The power converter 500 may include a power input stage 502, a resonant stage 504 and a power output stage 506, a detector 508 and a control circuit 510. As shown in FIG. 5, the power input stage 502, the resonant stage 504 and the power output stage 506 are connected in cascade. The detector 508 may be coupled to the resonant stage 504. The control circuit 510 is coupled between the detector 508 and the power input stage 502.

In some embodiments, the power converter 500 is an LLC resonant converter as shown in FIG. 1. Alternatively, the power converter 500 may be a three-element resonant converter topology such as an inductor-capacitor-inductor (LCL) resonant converter and/or the like. Furthermore, the power converter 500 may be a two-element resonant converter topology such as an inductor-capacitor (LC) resonant converter and/or the like. Furthermore, the power converter 500 may be a higher order resonant converter topology such as an LCLC resonant converter, an LCLCL resonant converter and/or the like.

The detector 508, as shown in FIG. 5, detects a signal from the resonant stage 504. The detected signal may include a variable indicating whether the power converter 500 operates at its resonant frequency. In some embodiments, when the power converter 500 operates at its resonant frequency, the magnitudes of some operating variables such as the voltage across the resonant inductor Lr (not shown but illustrated in FIG. 6), the current flowing through a common mode capacitor Ccm (not shown but illustrated in FIG. 7) and/or the like are reduced. On the other hand, when the switching frequency of the power converter 500 is away from its resonant frequency, the magnitudes of the voltage across the resonant inductor Lr, the current flowing through the common mode capacitor Ccm and/or the like are increased.

In some embodiments, the detector 508 detects the variation of the magnitude of the voltage across the resonant inductor and sends the detected signal to the control circuit 510. The control circuit 510 compares the detected signal with a predetermined threshold. If the magnitude of the detected signal is greater than the threshold, the control circuit 510 adjusts the switching frequency of the power converter 500 until the magnitude of the detected signal is less than the predetermined threshold. As a result, the power converter 500 is forced to operate at a frequency close to its resonant frequency. Such a frequency helps the power converter 500 achieve higher efficiency through zero voltage switching and/or zero current switching.

One advantageous feature of having the detector 508 shown in FIG. 5 is that the detector 508 and the control circuit 510 may form an adaptive control loop. Such an adaptive control loop helps the power converter 500 operate at its resonant frequency. In other words, a variety of factors such as noise, parasitic parameters and/or the like may cause the actual resonant frequency not equal to the natural resonant frequency calculated based upon equation (4) above. The control circuit 510 may force the power converter 500 to operate at a frequency close to its actual resonant frequency based upon the real-time detected signal from the detector 508. As such, the power converter 500 is capable of dynamically adjust its switching frequency so that the power converter 500 can achieve higher efficiency through zero voltage switching and/or zero current switching. Throughout the description, the adaptive control mechanism shown in FIG. 5 is alternatively referred to as a maximum efficiency point tracking (MEPT) control mechanism.

It should be noted that dynamically adjusting the switching frequency through an adaptive control loop shown in FIG. 5 is simply one embodiment. Other schemes for improving efficiency, including duty cycle control, adjustable gate drive voltage control and adjustable bias voltage control, can be employed. For example, the power converter 500 is configured such that the gate drive voltage or the supply bias of the gate driver of the power converter 500 is increased when the load current is greater than a predetermined load level. On the other hand, the gate drive voltage or the supply bias voltage of the power converter 500 is reduced when the load current is less than the predetermined load level.

It should further be noted that the gate driver of the power converter 500 may be a lossless gate driver such as a resonant lossless gate driver and the like. The supply voltage modulation of the lossless gate driver may have an impact on the duty cycle of the power converter 500. In other words, such an adjustable bias voltage forms an effective duty cycle control mechanism of the power converter 500.

Furthermore, in a pulse width modulation (PWM) type gate driver, a duty cycle control mechanism may be employed to further improve the efficiency of the power converter 500. In some embodiments, the control circuit 510 of the power converter 500 is configured such that the duty cycle of the power converter 500 is increased when the load current is greater than a predetermined load level. On the other hand, the duty cycle of the power converter 500 is reduced when the load current is less than the predetermined load level.

Figure 6:
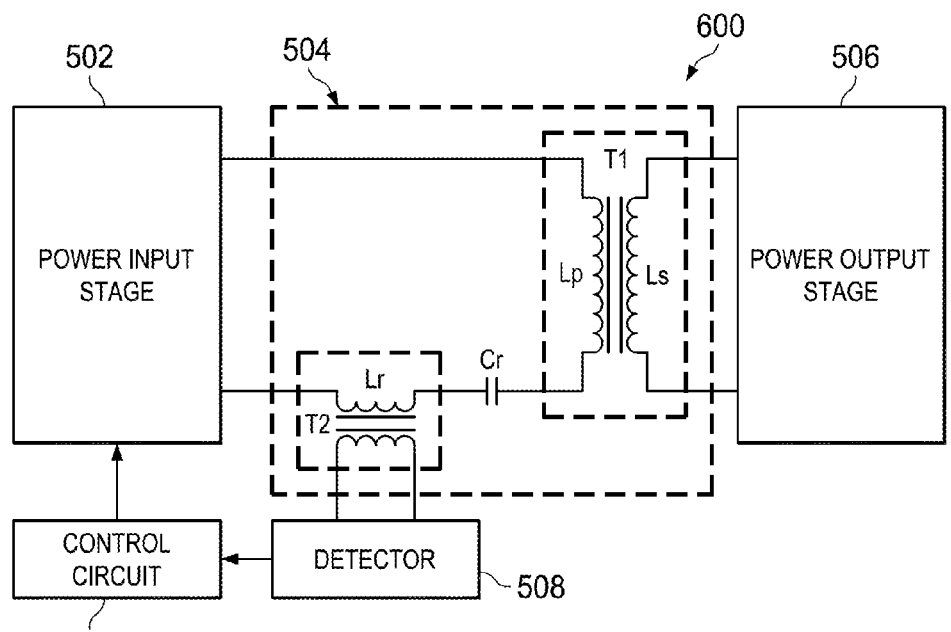
FIG. 6 illustrates a first illustrative implementation of the power converter shown in FIG. 5 in accordance with various embodiments of the present disclosure.

FIG. 6 illustrates a first illustrative implementation of the power converter shown in FIG. 5 in accordance with various embodiments of the present disclosure. As shown in FIG. 6, the detector 508 is coupled to the resonant tank 504 through a transformer. In some embodiments, the power converter 600 is an LLC resonant converter. The resonant tank 504 is formed by an inductor Lr, a capacitor Cr and a magnetizing inductance Lm (not shown) of the isolation transformer T1.

As shown in FIG. 6, the inductor Lr is a primary side of a transformer T2. The secondary side of the transformer T2 is coupled to the detector 508. In operation, when the switching frequency of the power converter 600 is away from the actual resonant frequency of the power converter 600, the voltage across the resonant inductor Lr increases as a result. The detector 508 may detect the increased voltage through the transformer T2 and send the detected signal to the control circuit 510. The control circuit 510 may compare the detected signal with a predetermined threshold and adjust the switching frequency of the power converter 600 accordingly. The detailed implementation of the detector 508 will be described below with respect to FIG. 8.

Figure 7:
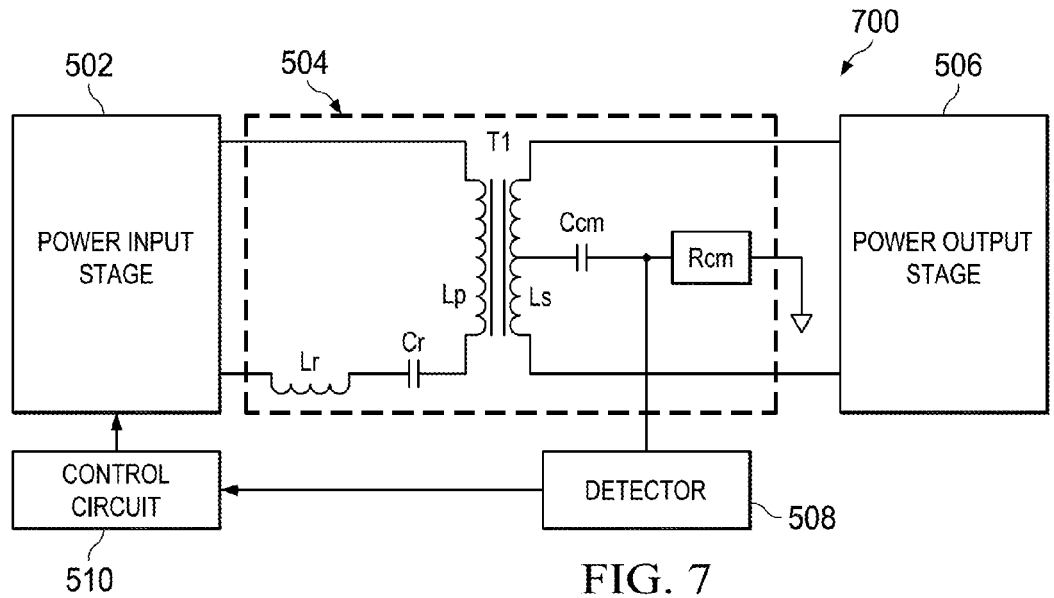
FIG. 7 illustrates a second illustrative implementation of the power converter shown in FIG. 5 in accordance with various embodiments of the present disclosure.

FIG. 7 illustrates a second illustrative implementation of the power converter shown in FIG. 5 in accordance with various embodiments of the present disclosure. The schematic diagram of FIG. 7 is similar to that of FIG. 6 except that the detector 508 detects the current flowing through a common mode capacitor Ccm rather than a voltage across the resonant inductor Lr. In some embodiments, the power converter 700 is an LLC resonant converter. There may be a common mode capacitor Ccm coupled to a midpoint of the secondary winding of the transformer T1. In addition, a resistor Rcm is connected in series with the common mode capacitor Ccm.

As shown in FIG. 7, the voltage across the resistor Rcm is proportional to the current flowing through the common mode capacitor Ccm. In operation, when the switching frequency of the power converter 700 is away from the resonant frequency of the power converter 700, the current flowing through the common mode capacitor Ccm increases as a result. The detector 508 may detect the increased current through the resistor Rcm. The control circuit 510 may adjust the switching frequency based upon the detected voltage so as to minimize the current flowing through the common mode capacitor Ccm. The detailed implementation of the detector 508 will be described below with respect to FIG. 9 and FIG. 10.

It should be noted that the diagrams shown in FIG. 6 and FIG. 7 are merely an example, which should not unduly limit the scope of the claims. One of ordinary skill in the art would recognize many variations, alternatives, and modifications. For example, the common mode capacitor Ccm may be coupled to a midpoint of the primary side of the transformer T1. Furthermore, the common mode capacitor Ccm may be coupled between the primary side winding and the secondary side winding of the transformer T1.

Figure 8:
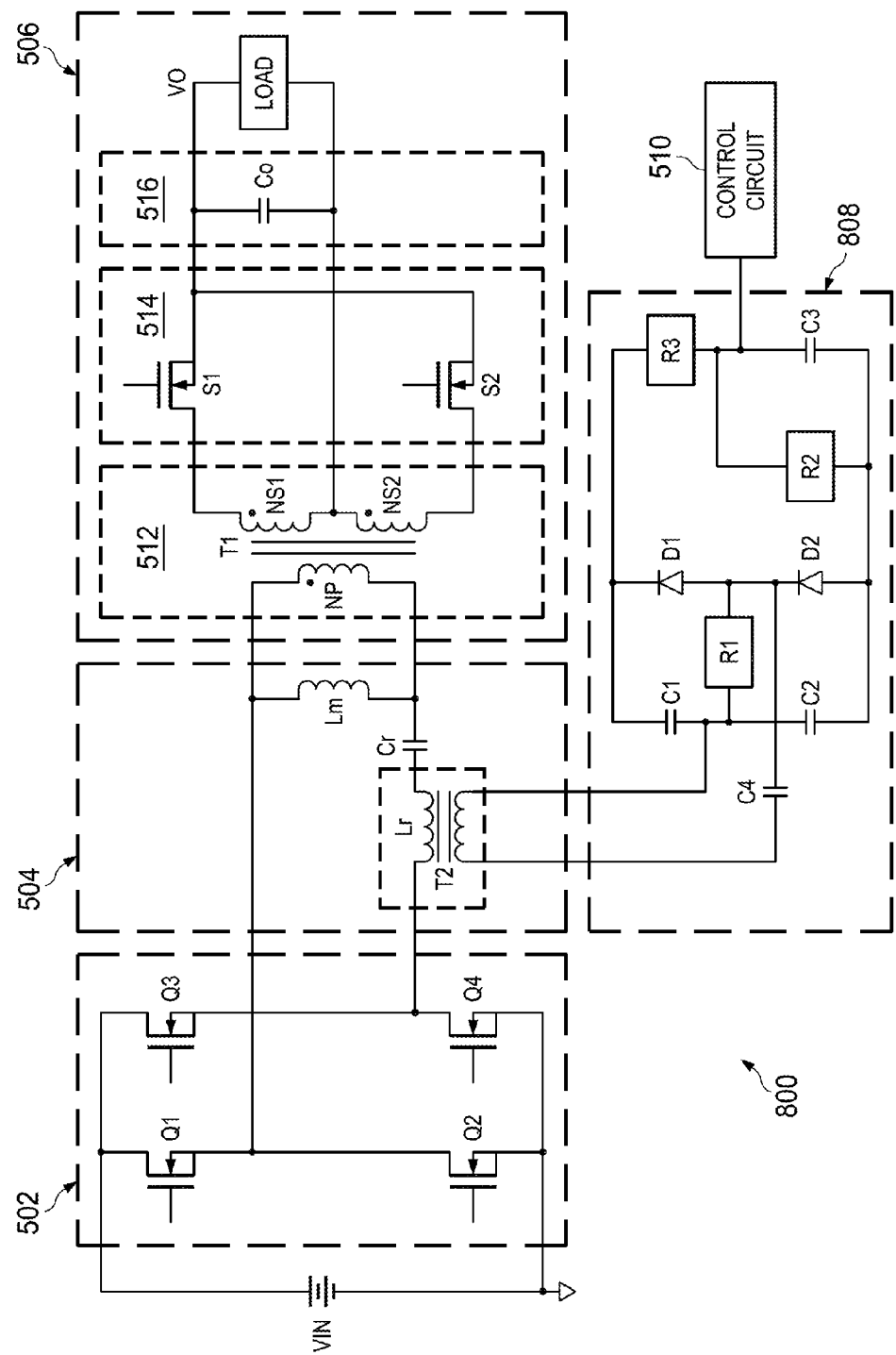
FIG. 8 illustrates a schematic diagram of the power converter shown in FIG. 6 in accordance with various embodiments of the present disclosure.

FIG. 8 illustrates a schematic diagram of the power converter shown in FIG. 6 in accordance with various embodiments of the present disclosure. The LLC resonant converter 800 includes a power input stage 502, a resonant tank 504 and a power output stage 506. The structure and operation principle of the power input stage 502, the resonant tank 504 and the power output stage 506 are similar to those shown in FIG. 1, and hence are not discussed again to avoid repetition.

The detector 808 is a first implementation of the detector 508 shown in FIG. 6. The detector 808 includes a rectifier, a dc blocking capacitor C4, a load resistor R1 and a divider/filter circuit. The rectifier, as shown in FIG. 8, includes C1, C2, D1 and D2. The rectifier is employed to convert the ac voltage across the secondary of the transformer T2 into a dc voltage.

The dc blocking capacitor C4 is selected to prevent the secondary of the transformer T2 from being saturated. The divider/filter circuit includes R2, R3 and C3. R2 and R3 form a voltage divider. An appropriate dc voltage signal is fed into the control circuit 510 through adjusting the ratio of R2 to R3. In addition, C3, R2 and R3 may form a filter to attenuate noise so that the control circuit 510 may receive a noise free dc signal.

In some embodiments, the inductance of the resonant inductor Lr is equal to 66 nH. The capacitance of the resonant capacitor Cr is equal to 220 nF. The resistance of R1 is equal to 500 ohm. The capacitance of C1 is equal to 2 nF. The capacitance of C2 is equal to 2 nF. The capacitance of C3 is equal to 3300 pF. The capacitance of C4 is equal to 22 pF. The resistance of R2 and R2 is equal to 2 Kohm.

It should be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

It should further be noted that the LLC resonant converter 800 may be of a high internal Q. In some embodiments, the internal Q of the LLC resonant converter 800 may be given by the following equitation:

$$Q = \frac{\sqrt{L_r/C_r}}{RL} \quad (5)$$

RL represents the internal resistance including the on resistance of the switches (e.g., Q1, Q2, Q3, Q4, S1 and S2), the winding resistance of the transformer T1, the resistance of the connecting traces and the like.

In some embodiments, RL is equal to 30 mohm. Lr is equal to 70 nH. Cr is equal to 306 nF. According to equation (5), Q is equal to 14.7. In other words, the efficiency point tracking control mechanism shown above is applicable to an LLC resonant converter having an internal Q value greater than 13.

Figure 9:
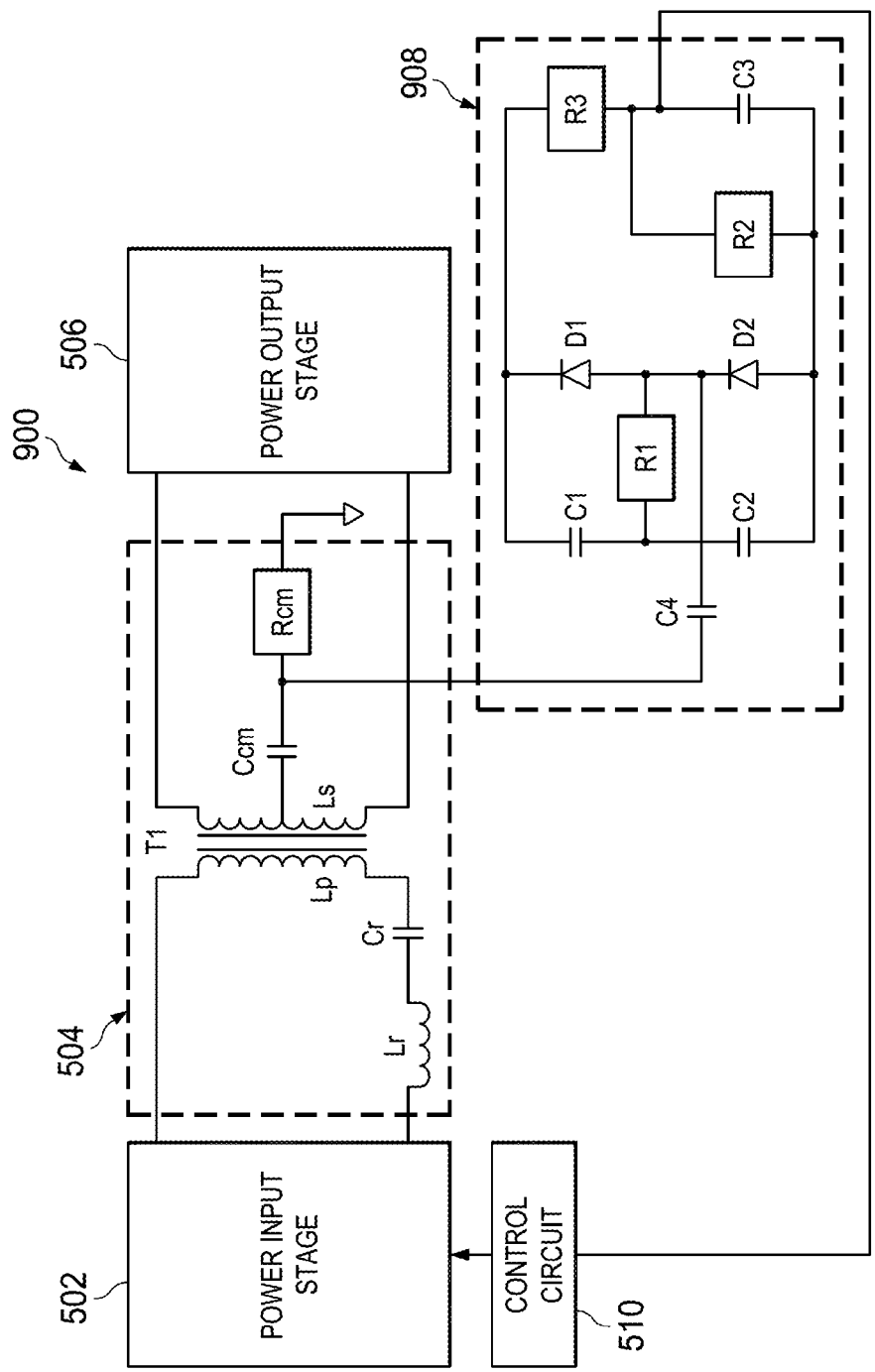
FIG. 9 illustrates a first implementation of the detector shown in FIG. 7 in accordance with various embodiments of the present disclosure.

FIG. 9 illustrates a first implementation of the detector shown in FIG. 7 in accordance with various embodiments of the present disclosure. The structure and operation principle of the detector 908 are similar to the detector 808 shown in FIG. 8, and hence are not discussed again to avoid repetition.

In some embodiments, the capacitance of the common mode capacitor Ccm is equal to 20 nF. The resistance of Rcm is equal to 1 ohm. The resistance of R1 is equal to 1 Kohm. The capacitance of C1 and C2 is equal to 2.2 nF. The capacitance of C3 is equal to 680 pF. The capacitance of C4 is equal to 68 pF. The resistance of R2 is equal to 10 Kohm and the resistance of R3 is equal to 2 Kohm.

Figure 10:
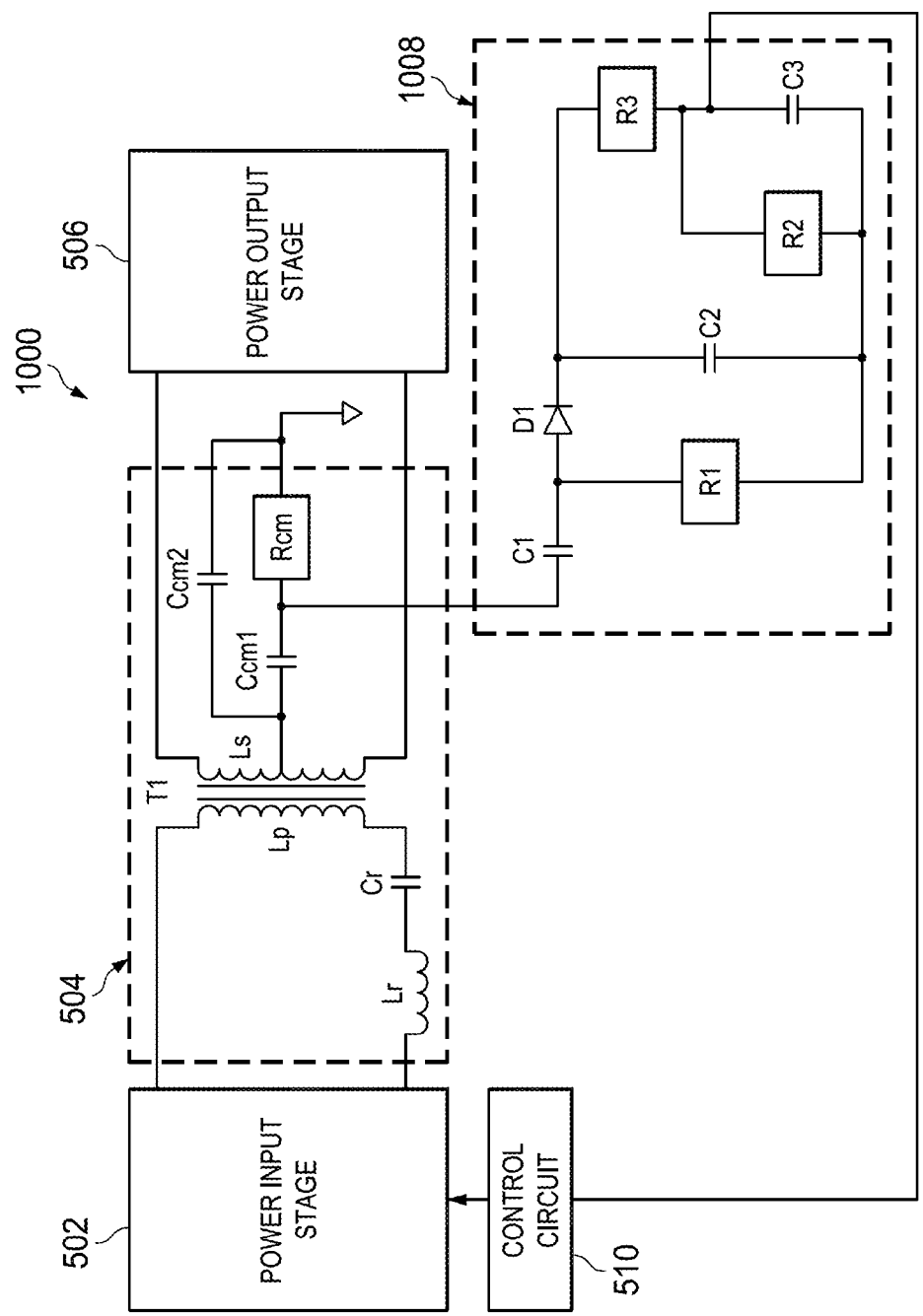
FIG. 10 illustrates a second implementation of the detector shown in FIG. 7 in accordance with various embodiments of the present disclosure.

FIG. 10 illustrates a second implementation of the detector shown in FIG. 7 in accordance with various embodiments of the present disclosure. The structure and operation principle of the power input stage 502, the resonant tank 504 and the power output stage 506 are similar to those shown in FIG. 9 except that there may be one more common mode capacitor Ccm2. As shown in FIG. 10, a first common mode capacitor Ccm1 and Rcm are connected in series between a midpoint of the secondary of the transformer T1 and ground. The second common mode capacitor Ccm2 is connected between the midpoint of the secondary of the transformer T1 and ground. In some embodiments, Ccm1 is equal to 10 nF. Ccm2 is equal to 10 nF. Rcm is equal to 1 ohm.

The structure of the detector 1008 is similar to that of the detector 908 shown in FIG. 9 except that the rectifier includes a diode D1 and a capacitor C2. The operation principle of the detector 1008 is similar to that of the detector 908, and hence is not discussed again herein to avoid repetition.

Figure 11:
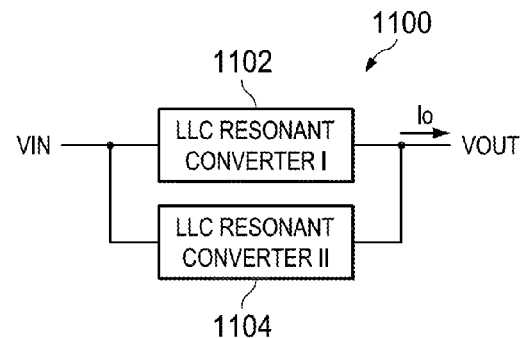
FIG. 11 illustrates a block diagram of two LLC resonant converters in parallel operation in accordance with various embodiments of the present disclosure.

FIG. 11 illustrates a block diagram of two LLC resonant converters in parallel operation in accordance with various embodiments of the present disclosure. As shown in FIG. 11, the first LLC resonant converter 1102 and the second LLC resonant converter 1104 are connected in parallel between VIN and VOUT. In some embodiments, both the first LLC resonant converter 1102 and the second LLC resonant converter 1104 are of the structure shown in FIG. 5. More particularly, the detectors of these two LLC resonant converters are capable of detecting a variable (e.g., voltage across the resonant inductor or current flowing through the common mode capacitor) and sending the detected signal to the respective control circuits. The control circuits are able to adjust the switching frequency of each LLC resonant converter. As a result, both LLC resonant converters may operate a switching frequency close to or equal to the actual resonant frequency of each LLC resonant converter.

According to the operating principle of the LLC resonant converters, an LLC resonant converter has a voltage gain equal to 1 when the LLC resonant converter operates at its actual resonant frequency. As described above, since both LLC resonant converters operate at their actual resonant frequencies, these two LLC resonant converters may be of a same voltage gain, which helps to balance the load current sharing between these two LLC resonant converters.

In some embodiments, the load current Io is about 20 A. The first LLC resonant converter 1102 operates at 950 KHz by using the MEPT control mechanism. Likewise, the second LLC resonant converter 1104 operates at 1050 KHz under the same control mechanism. The current flowing through the first LLC resonant converter 1102 is about 9.63 A. The current flowing through the second LLC resonant converter 1104 is about 10.37 A.

In alternative embodiments, the load current To is about 10 A. The first LLC resonant converter 1102 operates at 950 KHz by using the MEPT control mechanism. Likewise, the second LLC resonant converter 1104 operates at 1050 KHz. The current flowing through the first LLC resonant converter 1102 is about 5.36 A. The current flowing through the second LLC resonant converter 1104 is about 4.64 A.

Figure 12:
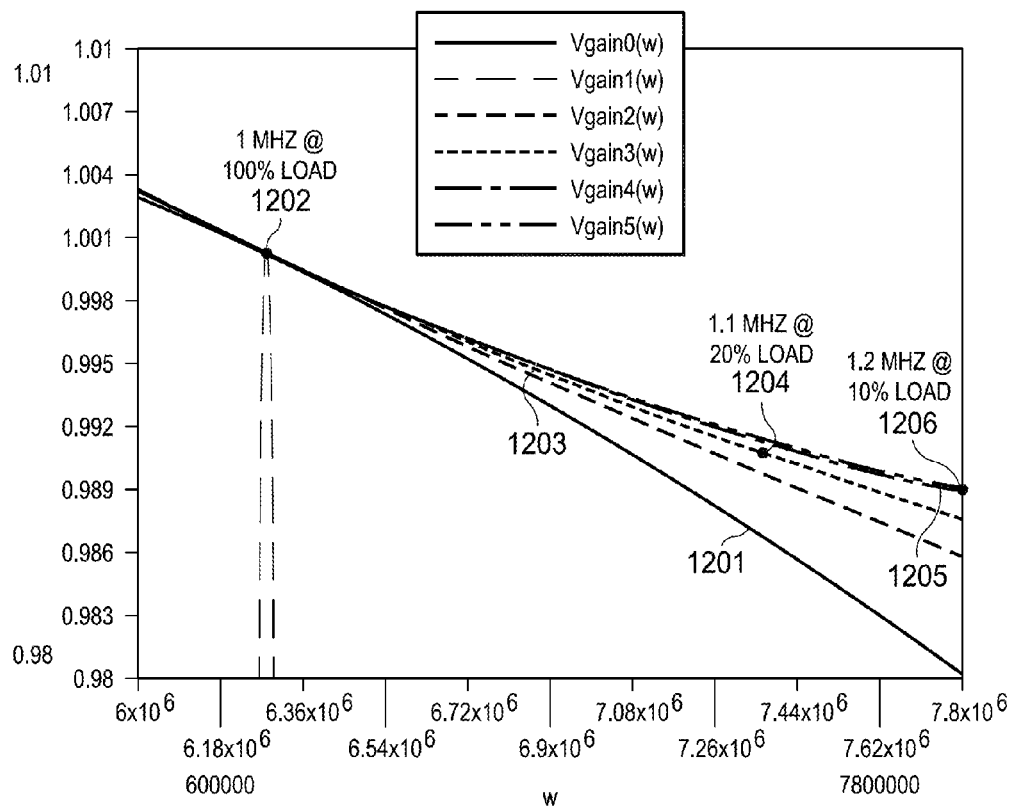
FIG. 12 illustrates a load regulation improvement mechanism in accordance with various embodiments of the present disclosure.

FIG. 12 illustrates a load regulation improvement mechanism in accordance with various embodiments of the present disclosure. The horizontal axis of FIG. 12 represents a switching frequency (angular frequency) of an LLC resonant converter (e.g., LLC resonant converter 100 shown in FIG. 1). The vertical axis of FIG. 12 represents the voltage gain of the LLC resonant converter 100 (shown in FIG. 1).

In some embodiments, when the switching frequency is equal to the resonant frequency of the resonant tank, the voltage gain of the LLC resonant converter 100 is approximately equal to 1. As shown in FIG. 12, when the LLC resonant converter 100 operates at the resonant frequency 1202, the output voltage of the LLC resonant converter 100 is approximately equal to the input voltage of the LLC resonant converter 100.

FIG. 12 includes a plurality of curves, which illustrate the voltage gain variations depending different loads. For example, at a light load (10% and 20% of a full load), the voltage gain (e.g., curve 1205 and curve 1203 respectively) of the LLC resonant converter 100 may be greater than that of the full load (e.g., curve 1201 shown in FIG. 12).

Due to a well-known voltage droop theory, the output voltage of the LLC resonant converter 100 may increase when the load current is reduced. On the other hand, the output voltage of the LLC resonant converter 100 may drop when the load current is increased. The voltage gain curves shown in FIG. 12 may be employed to improve the regulation of the LLC resonant converter 100. More particularly, in response to a load drop, when the load current is less than a predetermined load level, the LLC resonant converter 100 is configured to increase the switching frequency until the output voltage of the LLC resonant converter 100 is within a predetermined regulation range. On the other hand, when the load current is greater than the predetermined load level, the LLC resonant converter 100 is configured to reduce the switching frequency until the output voltage of the LLC resonant converter 100 is within the predetermined regulation range.

According to FIG. 12, when the LLC resonant converter 100 is at 100% load, the LLC resonant converter 100 operates at its resonant frequency 1202. When the load drops to 20% of the full load, the switching frequency of the LLC resonant converter 100 is increased to a higher switching frequency 1204 as shown in FIG. 12. Such a higher switching frequency helps to offset the effect from voltage droop.

In addition, when the load further drops to 10% of the full load, the switching frequency of the LLC resonant converter 100 is increased to a higher switching frequency 1206 as shown in FIG. 12. The regulation improvement control mechanism shown in FIG. 12 is alternatively referred to as a maximum output voltage accuracy tracking (MOVA) control mechanism.

It should be noted that the MOVA control mechanism may be applied to an LLC resonant converter independently to improve the output regulation. Alternatively, the MOVA control mechanism may be combined with the MEPT control mechanism described above with respect to FIG. 5. Such a combined control scheme helps to improve the efficiency as well as the regulation of the LLC resonant converter. Furthermore, the combined control scheme may be further combined with the adjustable gate drive voltage control, the adjustable bias voltage control and/or the duty cycle control described above with respect to FIG. 5.

In some embodiments, according to the combined control scheme above, under a full load condition, the MEPT control mechanism is dominant. The control circuit forces the LLC resonant converter to operate at 990 MHz at which the voltage across the resonant inductor Lr or the current flowing through the common capacitor Ccm is minimized. In addition, the gate drive voltage or the bias voltage of the gate driver is set to about 13 V.

Furthermore, at 50% of the full load, the MOVA control mechanism is activated. As a result, the switching frequency may be increased to 1 MHz in response to the load drop. Moreover, the gate drive voltage may be reduced to 11 V.

Furthermore, when the load drops to 20% of the full load, the switching frequency may be increased to 1.1 MHz according to the MOVA control mechanism. The gate drive voltage is reduced to 9 V. Likewise, the switching frequency may be increased to 1.2 MHz and the gate drive voltage is reduced to 6 V when the load drops to 10% of the full load.

It should further be noted that the MOVA control mechanism may include varying the switching frequency of the LLC resonant converter based upon the input voltage of the LLC resonant converter. More particularly, FIG. 2 illustrates the relationship between the gain of the LLC resonant converter and the switching frequency. According to the curves shown in FIG. 2, the regulation of the LLC resonant converter may be improved by varying the switching frequency of the LLC resonant converter.

Referring back to FIG. 2, a switching frequency higher than the resonant frequency may lead to a gain drop. Such a gain drop may help to improve the regulation of the LLC resonant converter. For example, at a normal input voltage such as 48 V, the LLC resonant converter may operate at a switching frequency approximately equal to the resonant frequency of the LLC resonant converter. In response to an input voltage increase, the switching frequency may be increased until an output voltage of the LLC resonant converter is within a predetermined regulation range.

It some embodiments, depending on different applications and topology variations, the curves shown in FIG. 2 may be different. However, for a particular application and an LLC resonant converter, a predetermined function can be created based upon the gain curves of this LLC resonant converter. Such a predetermined function may be implemented in the control circuit 510 shown in FIG. 5.

In sum, the MOVA control mechanism may comprise varying the switching frequency of an LLC resonant converter based upon the load of the LLC resonant converter, the input voltage of the LLC resonant converter and/or any combinations thereof.

Figure 13:
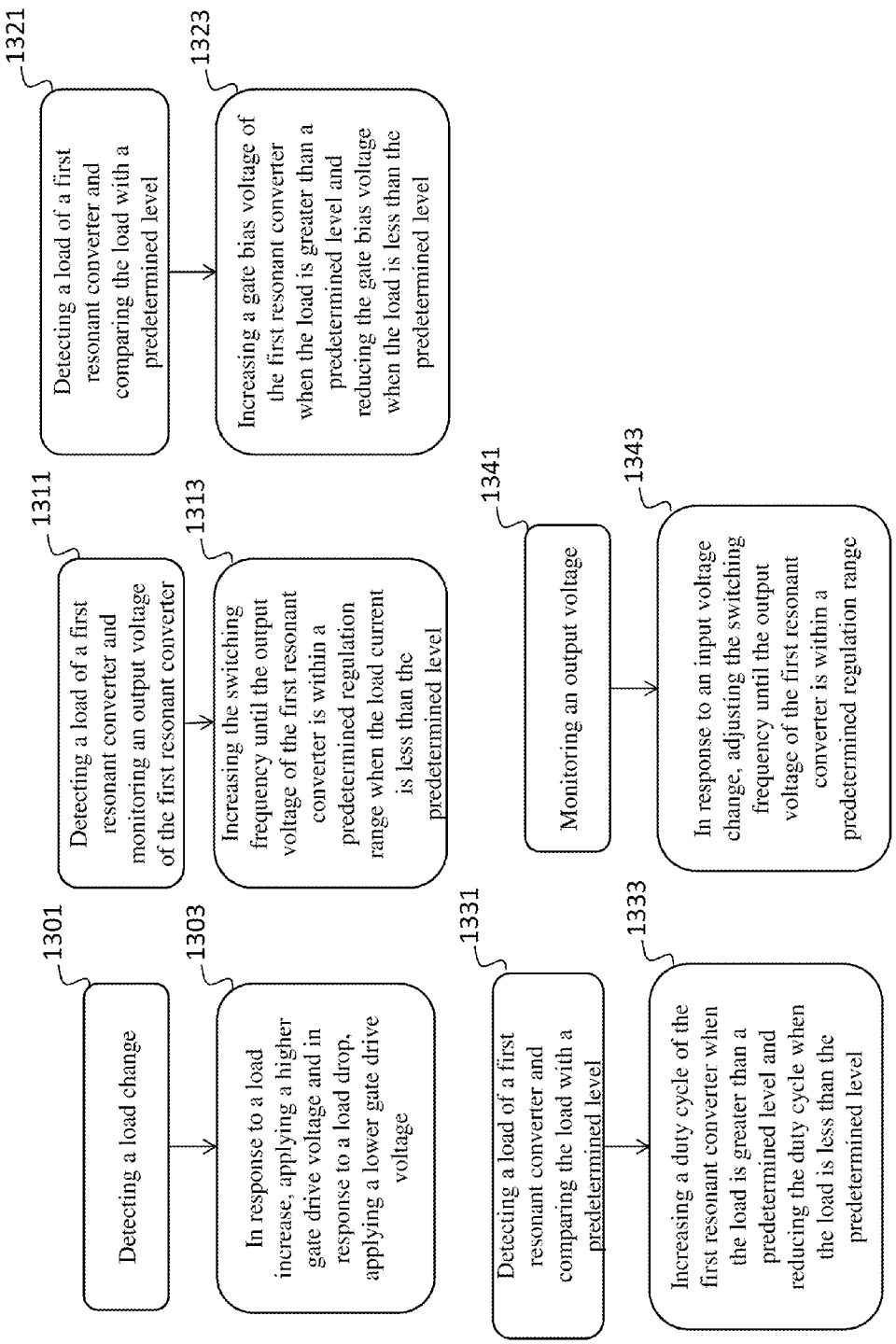
FIG. 13 illustrates five flow charts.

FIG. 13 illustrates five flow charts. A first flow chart includes step 1301 and 1303. At step 1301, a converter detects a load change. At step 1303, in response to a load increase, applying a higher gate drive voltage to the plurality of power switches. In response to a load drop, applying a lower gate drive voltage to the plurality of power switches. A second flow chart includes step 1311 and 1313. At step 1311, a load of a first resonant converter is detected and an output voltage of the first resonant converter is monitored. At step 1313, increasing the switching frequency until the output voltage of the first resonant converter is within a predetermined regulation range when the load current is less than the predetermined level. A third flow chart includes step 1321 and 1323. At step 1321, a load of a first resonant converter is detected. The detected load is compared with a predetermined level. At step 1323, increasing a gate bias voltage of the first resonant converter when the load is greater than a predetermined level and reducing the gate bias voltage when the load is less than the predetermined level. A fourth flow chart includes step 1331 and 1333. At step 1331, a load of a first resonant converter is detected. The detected load of the first resonant converter is compared with a predetermined level. At step 1333, increasing a duty cycle of the first resonant converter when the load is greater than a predetermined level and reducing the duty cycle when the load is less than the predetermined level. A fifth flow chart includes step 1341 and 1343. At step 1341, an output voltage is monitored. At step 1343, in response to an input voltage change, adjusting the switching frequency until the output voltage of the first resonant converter is within a predetermined regulation range.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
 an input stage coupled to a power source, wherein the input stage comprises a plurality of power switches;
 a resonant tank coupled to the plurality of power switches;
 a transformer coupled to the resonant tank;
 an output stage coupled to the transformer;
 an efficiency point tracking indicator coupled to the converter, wherein:
  the efficiency point tracking indicator is a current flowing through a common mode capacitor coupled to the transformer, wherein the common mode capacitor is directly connected to a midpoint of a secondary side of the transformer;
 a detector coupled to the efficiency point tracking indicator; and
 a control circuit configured to receive an efficiency point tracking signal from the detector and adjust a switching frequency of the power switches based upon the efficiency point tracking signal.

2. The converter of claim 1, wherein:
 the common mode capacitor is coupled to ground through a resistor, wherein the detector is configured to detect the current flowing through the common mode capacitor through detecting a voltage across the resistor.

3. The converter of claim 1, wherein the detector comprises:
 a dc blocking capacitor;
 a rectifier coupled to the dc blocking capacitor, wherein the rectifier is configured to convert an ac signal into a dc signal;
 a load resistor; and
 a voltage divider coupled to the rectifier.

4. The converter of claim 3, wherein the rectifier comprises:
 a first capacitor and a second capacitor connected in series; and
 a first diode and a second diode connected in series, wherein the load resistor is coupled between a common node of the first capacitor and the second capacitor, and a common node of the first diode and the second diode.

5. The converter of claim 3, wherein the rectifier comprises a diode and a capacitor, and wherein:
 the diode is coupled between an input node and an output node of the rectifier;
 the capacitor is coupled between the output node of the rectifier and ground; and
 the load resistor is coupled between the input node of the rectifier and ground.

6. The converter of claim 1, wherein:
 the control circuit is configured to adjust the switching frequency of the power switches until a magnitude of the efficiency point tracking signal from the detector is less than a predetermined threshold.

7. A method comprising:
 providing a resonant converter, wherein the resonant converter comprises:
  an input stage coupled to a power source, wherein the input stage comprises a plurality of power switches;
  a resonant tank coupled to the plurality of power switches;

a transformer coupled to the resonant tank; and
an output stage coupled to the transformer;
detecting a signal indicating a soft switching process of the resonant converter, wherein the signal is proportional to a current flowing through a common mode capacitor, wherein the common mode capacitor is directly connected to a midpoint of a secondary side of the transformer; and
adjusting, by a control circuit, a switching frequency of the resonant converter until a magnitude of the signal is less than a predetermined threshold.

8. The method of claim 7, further comprising:
in response to a load increase, applying a higher gate drive voltage to the plurality of power switches; and
in response to a load drop, applying a lower gate drive voltage to the plurality of power switches.

9. The method of claim 7, wherein:
the common mode capacitor is coupled to a midpoint of a secondary winding of the transformer.

10. A method comprising:
providing a first resonant converter, wherein the first resonant converter comprises:
  a power stage comprising:
    an input stage coupled to a power source, wherein the input stage comprises a plurality of power switches;
    a resonant tank coupled to the plurality of power switches;
    an isolation device coupled to the resonant tank; and
    an output stage coupled to the isolation device through a rectifier; and
  a control circuit coupled to the power switches, wherein the control circuit generates a plurality of gate drive signals for the power switches;
detecting a signal indicating a soft switching process of the first resonant converter, wherein the signal is proportional to a current flowing through a common mode capacitor, wherein the common mode capacitor is directly connected to a midpoint of a secondary side of the isolation device;
detecting a load current of the first resonant converter; and
configuring a switching frequency of the first resonant converter such that:
  adjusting the switching frequency until a magnitude of the signal is less than a predetermined threshold when the load current is greater than a predetermined load level; and
  increasing the switching frequency until an output voltage of the first resonant converter is within a predetermined regulation range when the load current is less than the predetermined load level.

11. The method of claim 10, further comprising:
providing a second resonant converter, wherein:
  the first resonant converter and the second resonant converter are connected in parallel; and
  the second resonant converter is of a same structure as the first resonant converter.

12. The method of claim 11, further comprising:
adjusting the switching frequency of the first resonant converter until the switching frequency of the first resonant converter is approximately equal to a resonant frequency of the first resonant converter; and
adjusting the switching frequency of the second resonant converter until the switching frequency of the second resonant converter is approximately equal to a resonant frequency of the second resonant converter.

13. The method of claim 10, further comprising:
increasing a gate bias voltage of the first resonant converter when the load current is greater than the predetermined load level; and
reducing the gate bias voltage of the first resonant converter when the load current is less than the predetermined load level, wherein a gate driver of the first resonant converter is a lossless gate driver.

14. The method of claim 10, further comprising:
increasing a duty cycle of the first resonant converter when the load current is greater than the predetermined load level; and
reducing the duty cycle of the first resonant converter when the load current is less than the predetermined load level, wherein a gate driver of the first resonant converter is a PWM gate driver.

15. The method of claim 10, wherein:
the plurality of gate drive signals are sent to the power switches through a plurality of gate drivers, wherein the gate drivers are lossless gate drivers.

16. The method of claim 10, further comprising:
in response to an input voltage change, adjusting the switching frequency until the output voltage of the first resonant converter is within a second predetermined regulation range.

* * * * *